United States Patent [19]

Steinmetz

[11] 4,302,373
[45] Nov. 24, 1981

[54] WATER-BORNE COATING COMPOSITION MADE FROM MODIFIED EPOXY RESIN, POLYMERIC ACID AND TERTIARY AMINE

[75] Inventor: William H. Steinmetz, Collingswood, N.J.

[73] Assignee: E. I. Du Pont de Nemours and Company, Wilmington, Del.

[21] Appl. No.: 175,397

[22] Filed: Aug. 5, 1980

[51] Int. Cl.³ .................... C08L 33/00; C08L 33/02; C08L 63/10; C08L 63/00
[52] U.S. Cl. ........................ 260/29.3; 260/29.2 EP; 260/29.4 R; 260/29.6 NR; 260/29.6 TA; 260/29.6 H; 260/29.6 B; 260/29.6 WA; 260/29.4 UA; 428/418; 428/416; 525/119; 525/531; 525/533; 525/109; 525/110
[58] Field of Search ................ 260/29.4 UA, 29.4 R, 260/29.6 H, 29.3, 29.6 NR, 29.2 EP, 29.2 E, 29.6 B, 29.6 TA, 29.6 WA; 525/119, 531, 533

[56] References Cited

U.S. PATENT DOCUMENTS

| | | | |
|---|---|---|---|
| 4,021,396 | 5/1977 | Wu | 260/29.6 NR |
| 4,065,416 | 12/1977 | Cristienson et al. | 260/29.4 UA |
| 4,076,675 | 2/1978 | Sommerfeld | 260/29.4 UA |
| 4,076,676 | 2/1978 | Sommerfeld | 260/29.4 R |
| 4,094,844 | 6/1978 | Allen et al. | 260/29.3 |
| 4,150,006 | 4/1979 | Raudenbusch et al. | 260/29.2 EP |
| 4,170,579 | 10/1979 | Bosso et al. | 260/29.4 UA |
| 4,247,439 | 1/1981 | Matthews et al. | 260/29.6 NR |

FOREIGN PATENT DOCUMENTS

| | | |
|---|---|---|
| 6334 | 1/1980 | European Pat. Off. |
| 6336 | 1/1980 | European Pat. Off. |
| 1257603 | 12/1971 | United Kingdom |
| 1488241 | 6/1975 | United Kingdom |

OTHER PUBLICATIONS

Derwent Abst. 90677S (JS0134-030), Soken Chem. Eng. KK, Oct. 23, 1975, "Water Soluble Resin Contg. Compsn. Prepn . . . ".
Derwent Abst. 82884 (BE854523), Nov. 14, 1977, "Chain Term. Grafted Epoxy Resin . . . ", SCM Corp.
Derwent Abst. 61871 (BE863-937), "Thermosetting Ag. Coating Comp . . . . ", Aug. 14, 1978, DuPont.

*Primary Examiner*—John C. Bleutge
*Assistant Examiner*—Herbert J. Lilling

[57] ABSTRACT

Water-borne reaction products of (a) carboxylfunctional polymers; (b) modified polyepoxides; and (c) tertiary amines are useful as film-forming components of coating compositions which can be spray-, flow-, dip-, roller-, or electro-coated. The coating compositions are useful as such or can be crosslinked with crosslinking agents such as a nitrogen resin and, when coated on metal and paper substrates, they provide coatings of improved properties, including a high degree of flexibility during machining and stamping of the coated articles, corrosion resistance, gloss, hydrolytic stability, and nonadulterating of foods and beverages in contact therewith.

28 Claims, No Drawings

WATER-BORNE COATING COMPOSITION MADE FROM MODIFIED EPOXY RESIN, POLYMERIC ACID AND TERTIARY AMINE

BACKGROUND OF THE INVENTION

This invention relates to coating compositions based on a water-borne reaction product of a carboxyl-functional polymer, a modified epoxide, and a tertiary amine, having general utility in coating metallic and paper substrates. It is more particularly directed to coating compositions useful as automotive and can coatings.

Coatings of the prior art are often dissolved or dispersed in organic solvents. Among commonly utilized thermosetting compositions are those based on epoxy resins crosslinked with nitrogen resins, usually in an acid catalyzed process.

Increased awareness of the environmental hazards of allowing organic solvent vapors to enter the atmosphere, the desirability of a single system that can be applied not only by the more conventional techniques of spray, roller or flow coating but also by electrodeposition, and the economy resulting from the substitution of water for some or all of the solvents in a coating composition, are all factors mitigating in favor of water-borne coating compositions.

Aqueous epoxy-acrylic-amine coating compositions of other investigators, including U.S. Pat. Nos. 3,969,300—Nagata (1976) and 4,021,396—Wu (1977) are less stable than desired or lack advantages of the present invention.

The composition of this invention is an aqueous solution or dispersion of the reaction product of a carboxyl-functional polymer, a modified terminally functional epoxy resin with at least some of its epoxide groups converted to esters, ethers or phenolic hydroxy groups, and a tertiary amine. Such a water-borne system can optionally contain a crosslinking agent, is stable, and can be applied to metallic substrates by spray, roller, dip or flow coating or by electrodeposition at the anode and to paper.

SUMMARY OF THE INVENTION

According to the present invention, there is provided a water-borne coating composition based on polymeric quaternary salts of polymeric acids which are the product of the reaction in aqueous media of:

(A) not less than 50% by weight, based on the weight of (A) plus (B), of a modified polyepoxide in the form of an ester, an ether, or a phenolic hydroxyl which contained, prior to modification, on the average, two terminal 1,2-epoxy groups per molecule and had an epoxy equivalent weight of 750–5,000, said modification being done by reacting at least about 25%, preferably about 50–95%, of the epoxy groups with at least one of groups selected from monobasic acids to form esters, monohydric phenols to form ethers, or polyhydric phenols to form phenolic hydroxyl terminated polymers;

(B) a carboxyl-functional polymer in an amount sufficient to provide at least 1.25, preferably at least about 2.0, most preferably about 4.6, equivalents of carboxyl groups, when the source of the carboxyl group is a monoprotic acid, and at least 2.0 equivalents of carboxyl groups, when the source of such groups is a diprotic acid, per equivalent of 1,2-epoxy groups in the epoxy resin of (A), said polymer having an average molecular weight (determined by gel permeation chromatography) of 2,000–100,000, preferably about 3,000–40,000, and an acid number of 100–500, preferably about 150–350, most preferably about 300; and (C) at least 1.25, preferably at least about 1.75, most preferably about 3.0, equivalents of a tertiary amine per equivalent of 1,2-epoxy groups in the epoxy resin of (A), said tertiary amine being selected from the group consisting of $R_1R_2R_3N$, pyridine, N-methyl pyrrole, N-methyl piperidine, N-methyl pyrrolidine, N-methyl morpholine, and mixtures therein and wherein $R_1$ and $R_2$ are substituted or unsubstituted monovalent alkyl groups containing one or two carbon atoms in the alkyl portion and $R_3$ is a substituted or unsubstituted monovalent alkyl group containing 1–4 carbon atoms; and (D) optionally, 10–90% of the amount required for stoichiometric reaction with the carboxyl-functional polymer of (B) of at least one primary, secondary or tertiary amine or monofunctional quaternary ammonium hydroxide;

wherein for increasing ratios of carboxyl groups to 1,2-epoxy groups, the amount of amine is increased to keep the carboxyl-functional polymer water dispersible, in which reaction product at least about 50%, preferably at least about 75%, of the epoxide groups on the modified polyepoxides are in the form of quaternary ammonium salts.

Among the selected groups reacting with the polyepoxide are:

(1) monobasic acids, aliphatic or aromatic, such as pelargonic, stearic, para tertiary butyl benzoic, 2-ethyl hexoic, caprylic, or benzoic acids to form esters;

(2) monohydric phenols, or hydrocarbon substituted phenols with 1–10 carbon atoms in the substituent such as nonyl phenol to give ethers; and (3) polyhyrdric phenols such as bisphenol A to give phenolic hydroxyl terminated polymers.

Preferably, components (A), (B) and (C) are capable of forming a hydrogel structure with components (A), (B) and (C) comprising about 0.1–50% of the coating composition and the remainder comprising water and, optionally, organic liquid(s) in a volume ratio of from 70:30 to all water, sometimes preferably 80:20. (Percentages, proportions and ratios herein are by weight except where indicated otherwise).

The water-borne coating composition can be crosslinked without the addition of a crosslinking agent or, optionally, it can contain crosslinking agents such as a nitrogen resin or a phenolic resin, as well as additives commonly utilized in coating compositions such as pigments, fillers, UV absorbers, and the like.

DESCRIPTION OF THE INVENTION

The water-borne coating composition of the invention is a solution or dispersion of the reaction products of a modified epoxy resin, a tertiary amine, and a carboxyl-functional polymer. By mixing these components in a random order and utilizing aqueous solutions of highly specific tertiary amines such as dimethyl ethanol amine, a stable, water soluble or dispersible salt of a polymeric quaternary ammonium hydroxide and a carboxyl-functional polymer results which can be crosslinked without the addition of external crosslinking agents. The optional addition of an external crosslinking agent, such as a nitrogen resin, also affords a crosslinkable solution or dispersion which is stable at room temperature. Both compositions, the salt and the solution or dispersion containing an external crosslinking agent, are infinitely dilutable with water.

Whether the coating composition is a solution or a dispersion is largely dependent on the nature of the particular amine used, the stoichiometry of the system, and the epoxy equivalent weight. Even when the composition is opaque some of the resinous components may be dissolved, and when the composition appears to be a clear solution it is possible that small amounts of the components are in a dispersed state. For sake of simplicity, hereafter the term "dispersion" will be used to denote the water-borne coating composition.

The dispersion, with or without an external crosslinking agent, as prepared, usually has a pH of above 7 and a nonvolatile content of up to 50%. Upon drying, a hard, solvent-resistant film having excellent resistance to acids, bases, hot water, and detergent results.

The low molecular weight epoxy resins to be utilized in the present invention are commonly known in the art. One class of such resins has the generalized formula

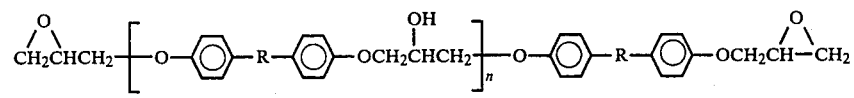

wherein R is an alkylene group of 1–4 carbon atoms and n is an integer from 1–12. The epoxy resins utilized in this invention contain an average of two terminal 1,2-epoxy groups per molecule and are in the epoxy equivalent weight range of 750–5000, preferably 1500–4000. They can also contain substituted aromatic rings.

One such preferred epoxy resin is "Epon 1004" where R is isopropylidene, the average value of n is 5, having an epoxy equivalent weight of 875–1025, with an average of about 950±50. The epoxy equivalent weight is defined as the grams of resin containing 1 gram-equivalent of epoxide as measured by ASTM D-1652. The coating composition containing "Epon 1004" affords a glossy, flexible, chemically-resistant film. Another preferred epoxy resin is "Epon 1007" where R is isopropylidene, the average value of n is 11, having an epoxy equivalent weight of 2000–2500, with an average of about 2175±50. The coating composition containing "Epon 1007" affords glossy, tough, flexible films upon cure. Another preferred epoxy is an analog of "Epon 1009" with an average epoxy equivalent weight of 3000 made by chain extending "Epon 829" (EW 195) with bisphenol A.

The modification of the polyepoxide can be accomplished by reaction with the selected groups in situ during polymerization such as of bisphenol-A type epoxides or preferably by post reaction with preformed epoxy resins.

The quantity of the epoxy resin to be utilized in the coating composition of this invention is determined in relation to the amount of carboxyl-functional polymer and the relative amounts are dependent on the end use application of the coating, but there must be at least 50%, preferably in the range of 65–90%, of epoxy rein present. There must be, furthermore, at least 1.25, preferably at least 2.0, and most preferably about 4.6, equivalents of carboxyl groups per equivalent of 1,2-epoxy groups in the epoxy resin. This minimum equivalent requirements is valid for those carboxyl-functional polymers which contain monoprotic acids derived from α,β-ethylenically unsaturated acid monomers such as acrylic acid, methacrylic acid, monoesters of alkanols having 1–8 carbon atoms with diacids, such as maleic acids, itaconic acid, fumaric acid, mesaconic acid, citraconic acid and the like, and mixtures thereof. For those carboxyl-functional polymers which contain diprotic acids derived from diacids such as maleic acid, itaconic acid, fumaric acid, mesaconic acid, citraconic acid, and mixtures thereof, the minimum requirement is 2.0 equivalents, preferably at least 2.5 equivalents, of carboxyl group per 1,2-epoxy groups. Usually, no more than 10.0, and preferably no more than 6.0, equivalents of carboxyl groups, per equivalent of 1,2-epoxy groups, will be present.

The carboxyl-functional polymers utilized in this invention are prepared by conventional free radical polymerization techniques from at least one ethylenically unsaturated monomer and at least one ethylenically unsaturated acid monomer. The choice of the alpha, beta-unsaturated monomer(s) is dictated by the intended end use of the coating composition and is practically unlimited. A variety of acid monomers can be used; their selection is dependent on the desired final polymer properties.

This acid monomer can be an ethylenically unsaturated acid, mono-protic or diprotic, anhydride or monoester of a dibasic acid, which is copolymerizable with the other monomer(s) used to prepare the polymer.

Illustrative monobasic acids are those represented by the structure

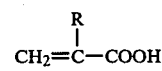

where R is hydrogen or an alkyl radical of 1–6 carbon atoms.

Suitable dibasic acids are those represented by the formula

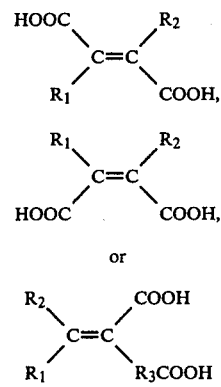

where $R_1$ and $R_2$ are hydrogen, an alkyl radical of 1–8 carbon atoms, halogen, cycloalkyl of 3–7 carbon atoms or phenyl, and $R_3$ is an alkylene radical of 1–6 carbon atoms. Half-esters of these acids with alkanols of 1-8 carbon atoms are also suitable.

The most preferred acid monomers are acrylic acid, methacrylic acid, and itaconic acid.

The acid number of the carboxyl-functional polymers is 100-500, which corresponds to concentrations of about 10-77% of the acid monomers by weight of the polymer. The acid number is the number of milligrams of potassium hydroxide required to neutralize one gram of the polymer. For purposes of illustration, an acid number of 100 corresponds to the presence in the polymer of either 12.8% acrylic acid, 15.3% of methacrylic acid, 11.5% of itaconic acid, or 10.3% of maleic or fumaric acid. An acid number of 500 corresponds to 64% of acrylic acid, 76.5% of methacrylic acid, 57.5% of itaconic acid, or 51.5% of maleic or fumaric acid in the polymer. Preferred acid number values are 150-350.

Vinyl aromatic monomers are commonly utilized to be copolymerized with the acid monomers. They are represented by the structure:

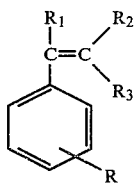

where R, $R_1$, $R_2$, and $R_3$ are hydrogen or an alkyl radical of 1-5 carbon atoms. Illustrative of these monomers are styrene, α-methyl styrene, vinyl toluene, and the like. The best polymers, in terms of final film properties, are those in which this type of monomer is styrene. The vinyl aromatic monomers can be present from 0-80% of the carboxyl-functional polymer, preferably from 40-80%, most preferably from 40-70%, and specifically at concentrations of about 42, 53, and 66%. For some purposes 10-45% may be preferred and, in some applications, the polymer contains no such monomer.

Other commonly utilized monomers are the α,β-unsaturated nitriles represented by the structure:

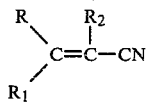

where R and $R_1$ are hydrogen, an alkyl radical of 1-18 carbon atoms, tolyl, benzyl or phenyl, and $R_2$ is hydrogen or methyl. Most commonly utilized are acrylonitrile and methacrylonitrile. The nitrile monomer can be present from 0-40% based on the carboxyl-functional polymer. The polymers preferably contain 10-30% and more preferably 18-22% of the polymer, of the nitrile monomer. For certain purposes it may be desirable to use 5-10% of the nitrile monomer and in some cases no such monomer is included in the polymers.

Other suitable monomers are esters of acrylic acid, methacrylic acid or mixtures thereof with $C_1$-$C_{16}$ alkanols. Preferred esters are the methyl, ethyl, propyl, n-butyl isobutyl, and 2-ethylhexyl esters of acrylic acid or methacrylic acid or mixtures of such esters. These esters can be present in concentrations of 0-97%, preferably 50-90% for automotive finishes and coil coatings and, for can coatings and appliance finishes, preferably 0-50%.

One can also utilize hydroxylalkyl (meth)acrylate monomers such as hydroxyethyl acrylate, hydroxypropyl acrylate, hydroxyethyl methacrylate, hydroxypropyl methacrylate or mixtures thereof. Up to 20% of such ester(s) can be incorporated.

It may be desirable, for certain uses, to include in the polymer acrylamide, methacrylamide or an N-alkoxymethyl (meth)acrylamide such as N-isobutoxymethyl (meth)acrylamide. Alternatively, a polymer containing copolymerized acrylamide or methacrylamide can be post-reacted with formaldehyde and an alkanol to produce an N-alkoxymethylated polymer.

The carboxyl-functional polymers can be prepared by polymerizing suitable monomers, in proper amounts, in an organic liquid medium. In general, this liquid is an organic liquid capable of medium hydrogen bonding, or a combination of this liquid with less than about 50% of an organic liquid capable of strong hydrogen bonding.

Preferably, the liquid medium for the polymerization is an alcohol mixture, generally 62% butanol and 38% of butyl cellosolve. Other media which could be used include either water-soluble or insoluble ketone. Optionally, the ketone can also contain less than about 50% of an ethylene glycol- or diethylene glycol monoalkyl ether (where the alkyl group contains 1-4 carbon atoms), or diacetone alcohol, and/or an alkanol of 1-4 carbon atoms or an alkanediol of 1-7 carbon atoms. A preferred medium is methyl ethyl ketone used by itself. Another preferred medium for the polymerization is a mixture of methyl ethyl ketone and ethylene glycol monobutyl ether.

A catalyst or polymerization initiator is ordinarily used in the polymerization of the carboxyl-functional polymers, in the usual amounts. This can be any free radical initiator that decomposes with a half-life of 0.5 to 2.5 hours at the reflux temperature of the organic liquid medium being used. Tertiary butyl perbenzoate, tertiary butyl peroxypivalate, and tertiary butyl peroxyisobutyrate are preferred.

The carboxyl-functional polymers utilized in the water-borne coating composition of this invention have a number average molecular weight, as determined by gel permeation chromatography, using a polystyrene standard, of about 2,000-100,000. The preferred weight average molecular weight range is 3,000-40,000.

During the preparation of the coating composition of this invention, an aqueous solution of a tertiary amine, specified below, is brought in contact with a solution of an epoxy resin in organic liquid(s) or with a solution of an epoxy resin and a carboxyl-functional polymer. A wide variety of organic liquids can be used to dissolve the epoxy resins and the carboxyl-functional polymers. Among the most commonly used solvents are alcohols such as isopropanol, the butyl alcohols, 2-hydroxy-4-methyl-pentane, 2-ethylhexyl alcohol, cyclohexanol, glycols such as ethylene glycol, diethylene glycol, 1,3-butylene glycol, ether alcohols such as ethylene glycol mono-ethyl ether, ethylene glycol mono-butyl ether, diethylene glycol mono-methyl ether, mixtures thereof, and many aliphatic and aromatic hydrocarbons if used admixed with at least one of the above.

While the exact mode of the reaction is not fully understood, it is believed that the tertiary amine first reacts with the carboxyl-functional polymer to form the corresponding salt which, in turn, can dissociate to allow the amine to react with the 1,2-epoxy groups of the epoxy resin. It is also possible, however, that the tertiary amie reacts directly with the 1,2-epoxy groups.

In either case, the resulting quaternary ammonium hydroxide can react with the carboxyl-functional polymer to yield a polymeric quaternary ammonium-amine mixed salt of a polymeric acid.

The reaction of tertiary amines with materials containing epoxy groups, to yield adducts containing quaternary ammonium groups, is known. Such reaction, when carried out in presence of water, can afford a product that contains both a hydroxyl group and a quaternary ammonium hydroxide. The reaction can be represented schematically as follows:

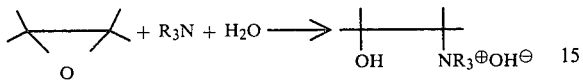

While most tertiary amines react with epoxy resins to form quaternary ammonium hydroxides, the preparation of the water-borne coating composition of this invention is carried out utilizing at least one tertiary amino selected from the group: $R_1R_2R_3N$, N-methyl pyrrolidine, N-methyl morpholine, pyridine, N-methyl pyrrole, N-methyl piperidine, and mixtures thereof, wherein $R_1$ and $R_2$ are substituted or unsubstituted monovalent alkyl groups containing one or two carbon atoms in the alkyl portion and $R_3$ is a substituted or unsubstituted monovalent alkyl group containing 1–4 carbon atoms. Some examples of $R_1R_2R_3N$ are: trimethyl amine, dimethyl ethanol amine (also known as dimethyl amino ethanol), methyl diethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, and mixtures thereof. Most preferably trimethyl amine or dimethyl ethanol amine is used.

The generation of a polymeric quaternary ammonium hydroxide which is water soluble or disperible when in presence of a nitrogen resin crosslinking agent is described in U.S. Pat. No. 4,076,676—Sommerfeld granted Feb. 28, 1978, and its relevant portions are hereby incorporated by reference.

The amount of tertiary amine needed in the preparation of the water-borne coating composition of this invention is determined by two factors. As a minimum, there is required at least 1.25 equivalents of tertiary amine per equivalent of 1,2-epoxy groups, preferably at least 1.75 equivalents, more preferably 3.0, for the formation of stable dispersions. As the ratio of the number of carboxyl groups in the carboxyl-functional polymer to the number of 1,2-epoxy groups in the epoxy resin increases, the amount of amine is also increased to keep the carboxyl-functional polymer water dispersible. This excess amine is believed to form a salt with some or all of the excess carboxyl groups of the polymer. It is preferred that no excess amine, over the total number of equivalents of carboxyl groups, be used in the coating composition of this invention. The amine utilized in excess of the 1.25 equivalents of the highly specific tertiary amine per equivalent of 1,2-epoxy groups need not be the same as, nor does it necessarily have to be selected from the group of, the highly specific tertiary amines. Any primary, secondary or tertiary amine or monofunctional quaternary ammonium hydroxide can be utilized in neutralizing carboxyl groups of the carboxyl-functional polymer which are not already neutralized. Among such tertiary amines are included: triethyl amine, diethyl ethanol amine, dimethyl cyclohexyl amine, triethanol amine, tributyl amine, dimethyl n-butyl amine, tripropyl amine, dimethyl lauryl amine, and γ-picoline. Primary and secondary amines preferably should not be used along with tertiary amines in the neutralization of the epoxies because unwanted covalent bonds could be formed, and this can interfere with the desired hydrogel formation.

The water-borne coating composition of this invention can be prepared without regard to the sequence of addition of the various components. It is preferred, however, to first dissolve the epoxy resin in the carboxyl-functional polymer, in presence of suitable organic liquids. Addition of a suitable tertiary amine, usually dissolved in water, completes the preparation of the polymeric quaternary ammonium salt of a polymeric acid. Additional water can then be added to achieve the final volume ratio of water and organic liquid of from 70:30 preferably to 90:10. Additional amine can also be added to insure dispersibility.

A preferred ratio of tertiary amine to water is approximately 1:5 by weight.

Permutations of methods useful for making the compositions of the invention include the following, starting with the modified polyepoxide, the acrylic resin and the amine, preferably an aqueous amine:

(A) Form the modified epoxy resin. Add acrylic resin to it. Add amine/water mixture.

(B) Form the modified epoxy resin. Premix the acrylic resin, amine, water and add to the modified epoxy resin.

(C) Form the modified epoxy resin. Add amine/water mixture. Add acrylic resin.

(D) Add the modified epoxy resin to the acrylic resin. Add amine/water mixture.

(E) Add the modified epoxy resin to the acrylic/resin/amine/water mixture.

(F) Add the modified epoxy resin to the amine/water mixture. Add the acrylic resin.

In each case, the reaction mass is heated to between 50° C. and the reflux temperature after the epoxy resin, amine and water are present to form a quaternary derivative. The preferred reaction temperature range is 80°–95° C.

In another preferred method of preparation of the coating composition, an epoxy resin is dissolved in a suitable organic liquid such as the mono-butyl ether of ethylene glycol or diethylene glycol, followed by the addition of an aqueous solution of a suitable tertiary amine. After the formation of the polymeric quaternary ammonium hydroxide is substantially complete, a carboxylfunctional polymer, dissolved in a suitable organic liquid is mixed with it with agitation. This latter solution can also contain any additional primary, secondary or tertiary amine, dissolved in water, necessary for dispersibility of the coating composition. Mixing of the components completes the preparation of the water-borne coating composition. This sequence of steps can also be carried out between room temperature and temperatures below the boiling point of the reaction media.

Yet another preferred method of preparation comprises the steps of dissolving the carboxyl-functional polymer in a suitable organic liquid, addition of an aqueous solution of a suitable tertiary amine, mixing in of an epoxy resin, and heating, preferably between 50°–100° C. and, more preferably, between 90°–110° C., followed by the requisite amount of water to obtain the final water-to-organic liquid volume ratio of from 70:30 to 90:10.

The polymeric quaternary ammonium-amine mixed salt of the carboxyl-functional polymer of the water-borne coating composition of this invention preferably is a complex hydrogel structure. It is the generation, during the epoxy/carboxyl/amine reaction, of such a hydrogel structure which affords the solubility or dispersibility, and stabilization, in water of the coating composition. This hydrogel formation is discussed in U.S. application Ser. No. 074,122 filed Sept. 14, 1979—Matthews and Sommerfeld now U.S. Pat. No. 4,247,439, granted Jan. 27, 1981. The modifications of the polyepoxides in the present invention cause the hydrogel structure to be less tightly bound by the reduced functionality quaternaries formed in this system in comparison with the hydrogel formed with the di-quaternaries of that prior application. This looser hydrogel can lead to lower viscosity during manufacture and in the final product. This can also result in improved adhesion to various substrates.

A possible schematic formula is shown by the formula below. The exact nature of the bonding is not known. The number of carboxyl groups in the schematically shown polymer molecules and of the relative portion of free acid groups to the amine salt groups are determined by the stoichiometry employed during the preparation of the coating composition. The schematic representation is shown to further the understanding of the nature of the invention:

groups and by measuring or knowing the weight per epoxy group in the modified polyepoxide before it is reacted with the acid and the amine.

Titration of the reaction product of the invention with alcoholic KOH to a phenophthalein end point gives a value which can be used to calculate the actual acid number of the product. This will differ from the theoretical acid number of the original carboxyl-functional polymer by the proportion of acid groups reacted with quaternary ammonium compounds. Unneutralized acid groups and acid groups neutralized with amines are titratable. Acid groups neutralized with quaternary ammonium compounds derived from oxiranes are masked and not titratable by this technique.

The difference between the actual acid number and the theoretical acid number would be equivalent to the proportion of epoxy groups if all the epoxy groups had been quaternized. Normally, it is found with the invention that about 95% of the epoxy groups are quaternized. The remainder appear to be esterified with the acid groups. For the invention, at least about 50% preferably at least about 75%, of the epoxide groups of the modified polyepoxide resin are in the form of quaternary ammonium salts.

The water-borne coating composition of this invention is a stable solution or dispersion and can be used as prepared. It can be crosslinked without the addition of an external crosslinking agent and can also be crosslinked with external crosslinking agents such as phenol formaldehyde resins or, preferably, nitrogen resins.

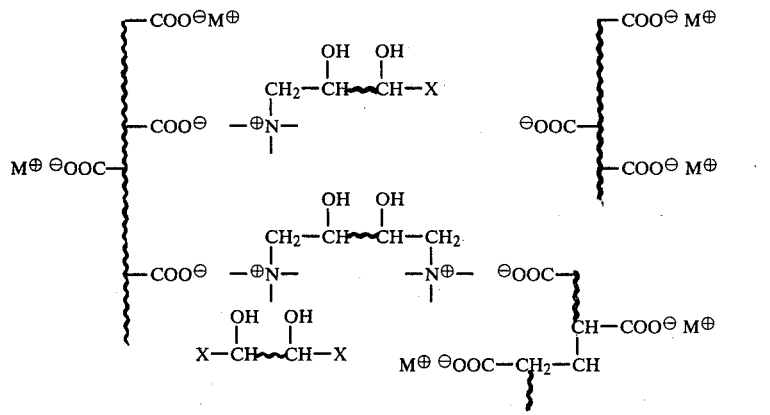

where $M^{\oplus}$ is hydrogen or a protonated primary, secondary or tertiary amine or a monofunctional ammonium group, X is an ether, ester or phenolic hydroxyl group, and

is formed from a tertiary amine selected from the group: $R_1R_2R_3N$, N-methyl pyrrolidine, N-methyl morpholine, pyridine, N-methyl pyrrole, N-methyl piperidine, and mixtures thereof, wherein $R_1$ and $R_2$ are substituted or unsubstituted monovalent alkyl groups containing one or two carbon atoms in the alkyl portion and $R_3$ is a substituted or unsubstituted monovalent alkyl group containing 1-4 carbon atoms.

The extent of quaternization of the epoxide groups can be determined indirectly by titration of the acid The nitrogen resins are well known. They are the alkylated products of amino-resins prepared by the condensations of at least one aldehyde with at least one of urea, N,N'-ethyleneurea, dicyandiamide, and amino-triazines such as melamines and guanamines. Among the aldehydes that are suitable are formaldehyde, revertible polymers thereof such as paraformaldehyde, acetaldehyde, crotonaldehyde, and acrolein. Preferred are formaldehyde and revertible polymers thereof. The amino-resins are alkylated with at least one and up to and including six alkanol molecules containing 1-6 carbon atoms. The alkanols can be straight chain, branched or cyclic.

Among the preferred nitrogen resins are partially methylated melamines, partially butylated melamines, hexaethoxymethylmelamine, hexamethoxymethylmelamine, dimethoxytetraethoxymethylmelamine, dibutoxytetramethoxymethylmelamine, butylated benzoguanamine, partially methylated urea, fully methylated urea, fully butylated urea, hexabutoxymethylmelamine, and mixtures thereof.

These nitrogen resins can be blended directly into the coating composition at the completion of the preparation or before final dilution with water, either as a solid or as a solution in some miscible organic liquid.

The nitrogen resins are ordinarily added to the compositions of the invention at concentrations ranging from 5 to 35%, preferably 8 to 20%, even more preferably 10 to 15%. The exact amount will be dictated primarily by the final properties desired of the composition and can be determined by one skilled in this art.

In the claims, the term "consisting essentially of" means not including other ingredients in amounts which change the basic and novel characteristics of the invention, including providing an aqueous acid-polymer-modified epoxy coating composition that can form a hydrogel and is useful as an interior coating for cans. Other commonly utilized additives such as coalescing aids, flow-control agents, pigments and the like can be added, in the usual amounts, if this appears necessary or desirable.

The water-borne composition can be applied by a variety of techniques and to a variety of substrates known in industry. For example, the coating composition of this invention can be utilized in the can manufacturing industry which utilizes mainly metallic cans, many of them cylindrical, made from aluminum, tin-free steel, electrolytic tin-plate, and quality-as-rolled steel, among others. Cans utilized for packaging and shipping food and beer or other beverages are mostly of the three-piece or the two-piece drawn-and-ironed (D and I) variety. Cans constructed from three pieces (body, top and bottom) can be roller coated before the metallic sheet is formed into the body of the can or can be spray coated after partial fabrication. The D and I cans, where the metal sheet is stamped to form a cylindrical body closed at one end, are generally spray coated.

The coating composition of this invention can also be applied by electrodeposition. In the electrodeposition process the water-borne composition is placed in contact with an electrically conductive cathode and an electrically conductive anode, with the surface to be coated being the anode. During the process an adherent film is deposited at the anode. The substantial lack of film formation at the cathode is through to be due to the preferential dissociation of the amine salt of the carboxyl groups over the polymeric quaternary ammonium salt of the carboxyl groups. It is believed that both electronic and steric factors are involved in the control of the dissociation. The negatively charged carboxylate anion migrates to the anode. The nitrogen resin crosslinking agent, if present in the coating composition, also migrates, in a possible physical entanglement with the polymeric quaternary ammonium salt of the carboxyl-functional polymer, to the anode.

The conditions under which the electrocoating is carried out are similar to those used in the electrodeposition of other types of coatings. The applied voltage can be varied, can range from 1 to 1000 volts, and is typically between 25 and 500 volts. The current density is usually between about 1 milliampere and 100 milliamperes per square centimeter. The current density tends to decrease during the coating process as the coating thickness increases. The coating time can vary from 1 to 120 seconds or longer and is typically between 1 and 5 seconds for coating cans.

The concentration of the coating composition depends upon the process parameters to be used and is not generally critical. Ordinarily the film-forming components comprise 0.1–50% and preferably 5–30%, for conventional coating methods, and 1–20%, for electrodeposition, of the total composition, the remainder being water and organic liquid(s). The latter are present in a volume ratio of from 90:10, preferably to 70:30.

The freshly deposited films are capable of being immediately dried and/or crosslinked, without regard to the method of coating used to obtain them.

The coating compositions of this invention can be dried to useful films as is or can be cured thermally as is or when containing, for example, a nitrogen resin crosslinking agent. After the composition has been applied to the substrate, baking at elevated temperatures brings about the desired crosslinking. Temperatures of 150° C. to 260° C., for 0.1 to 30 minutes, are typical baking schedules utilized.

The water-borne coating composition of this invention is useful in a variety of applications. This coating composition finds particular utility in the can industry where the composition can be applied to the interior of two-piece drawn-and-ironed and three-piece beer and beverage cans, to the exterior of three-piece beer and beverage cans, to the interior and/or exterior ends of two- or three-piece cans or two- or three-piece sanitary cans. When the coating composition of this invention is applied to the interior of food and beer or beverage cans by spray-coating, a thin uniform film is deposited which, after curing, corresponds to a coating weight of 0.3 to 1.3 milligrams per square centimeter (2–8 milligrams per square inch). Coatings utilized as an interior enamel have excellent taste and odor characteristics, that is to say, low extractables and sorption to prevent taste adulteration.

The water-borne composition also has utility, expecially when crosslinked with a nitrogen resin, in automotive primer, appliance finish, and coil coating applications, the final coated articles having especially desirable hardness and acid, base, solvent, and detergent resistance properties. The cured coatings are also resistant to salt spray and "processing." This latter property is tested in a steam-pressure cooker at approximately 120° C.

The invention is further illustrated by the following examples, in which the epoxy modification is referred to as capping.

PRELIMINARY EXAMPLE PREPARATION OF INTERMEDIATE—ACRYLIC RESIN "X"

Into a suitably equipped kettle, inerted with nitrogen, are added the following parts by weight:
Monobutyl ether of ethylene glycol: 91.567
Normal butanol: 32.503
Ethyl acrylate: 14.453
Tertiary butyl perbenzoate: 0.026
In a separate vessel, the following are added and mixed:
Ethyl acrylate: 54.764
Methacrylic acid: 122.060
Styrene: 72.919
Normal butanol: 2.050
Tertiary butyl perbenzoate: 2.351
The reactor is heated to reflux and the monomer mixture is added evenly to the refluxing reactor over a two-hour period. Then 7.932 parts of monobutyl ether of ethylene glycol are added as a rinse for monomer feed lines. Reflux is maintained for one hour, at which point 55.500 parts of normal butanol is added. Reflux temperatures are maintained for one hour, at which point the heat is turned off and 72.623 parts of normal butanol are added, followed by 82.312 parts of dimethyl ethanol amine (a tertiary amine) and 246.940 parts of deionized water, neutralizing the acid mostly by the formation of tertiary amine ions. The product is a solution of a styrene/ethyl acrylate/methacrylic acid//27.6/26.2/46.2 polymer at 30.8% solids in solvent, water and amine. The acid number of the product is 300 before neutralization.

EXAMPLE I

Partial Benzoate Capping

A—Resin
Epon 829: 1723.0
Bisphenol A: 915.0
Benzoic acid: 52.0
Mono butyl ether of ethylene glycol: 156.3

Heat to 130°–140° C. and allow to exotherm to about 200° C. Maintain temperature above 165° C. for two hours after peak exotherm. Theoretical epoxy equivalent weight is 3000 before benzoic acid reaction and 6000 after reaction. Acid number determination shows approximately 95% of benzoic acid is reacted.

Normal butanol: 680.0
Add to dilute and cool to 100° C.
Acrylic resin "X": 2388.0
Deionized water: 457.0

Add rapidly in order. Heat to reflux (93°–95° C.) and hold twenty-five minutes.

Deionized water: 5680.7

Preheat to 70°–80° C. and add evenly over one-hour period. Sample can be isolated here at 28% solids or converted to finished products as follows.

B—Can Coating 1
Acrylic epoxy product from A: 2852.4
Deionized water: 1034.0
Normal butanol: 40.0
Mono butyl ether of ethylene glycol: 69.6
Dimethyl ethanol amine: 4.0

This sample is ready to spray at 20.13% solids, a pH of 7.9, and Zahn #1 viscosity of 36 seconds. The volatiles are water/organic solvent=80/20 volume percent. The equivalent ratios are 0.5/4.6/3.0/1.0=benzoic acid/carboxyl from acrylic polymer/dimethyl ethanol amine/epoxy resin of 3000 epoxy equivalent weight, before capping. The weight ratio of acrylic resin/epoxy resin=22.2/77.8. When applied by spray to drawn and ironed cans, the coating exhibits good application properties and excellent adhesion to steel and treated or untreated aluminum substrates.

C—Can Coating 2
Acrylic epoxy product from A: 2568.0
Deionized water: 1194.8
Normal butanol: 134.0
Hexyl cellosolve: 20.0
Dimethyl ethanol amine: 4.0
Butylated melamine formaldehyde resin (Cymel 1156): 90.2

This example is ready to spray at 19.25% solids, a pH of 7.95, and Zahn #1 viscosity of 35 seconds. The volatiles are water/organic solvent=80/20 volume percent. The equivalent ratios are as above, with 10% melamine resin crosslinker on solids. When applied by spray to drawn and ironed cans, the coating exhibits good application properties and excellent adhesion to steel and treated or untreated aluminum substrates.

EXAMPLE II

PARTIAL BENZOATE CAPPING

A—Resin
Epon 829: 1632.92
Bisphenol A: 867.81
Benzoic acid: 49.20

Heat to 130°–140° C. and allow to exotherm to about 180°–200° C. Maintain temperature above 165° C. for 90 minutes after peak exotherm. Theoretical epoxy equivalent weight is 3000 before benzoic acid reaction.

Monobutyl ether of diethylene glycol: 147.98
Add and hold for additional 30 minutes above 165° C.
Monobutyl ether of diethylene glycol: 233.05
Normal butanol: 64.01
Add to dilute and cool below 100° C.
Acrylic resin "X": 1476.86
Deionized water: 33.83

Add rapidly in order. Heat to reflux and hold 25 minutes.

Deionized water: 4164.34

Preheat to 70°–80° C. and add evenly over 45 minutes.

This batch is at 34 weight percent solids. The solids have a weight ratio of acrylic/epoxy=15.4/84.6. The equivalent ratio is 0.5/3.0/1.95/1.0=benzoic acid/carboxyl from acrylic polymer/dimethyl ethanol amine/epoxy resin of 3000 epoxy equivalent weight, before capping.

B—Millbase
Titanium dioxide: 4.38
Carbon black: 0.08
Aluminum silicate: 30.60
Acrylic epoxy product from A: 41.49
Deionized water: 23.45

Grind in a ball mill to a fineness of 0.2 mil max.

C—Primer
Acrylic epoxy product from A: 2914.2
Monobutyl ether of diethylene glycol: 467.6
Alkylated benzoguanamine formaldehyde resin (Cymel 1123): 192.0
Millbase from B: 6228.3
Nonionic surfactant (Drewfax G-131): 97.9

Mix until uniform. Weight solids are 43.8%; pH is 7.8–8.4; viscosity is 600 centipoises, measured by Brookfield #5 spindle at 40 RPM. Applied by spray in a one mil dry film to cold rolled or Bonderite treated steel, and baked 30 minutes at 163° C. When topcoated, the coating shows good chip resistance, and good corrosion resistance after two weeks in salt spray.

EXAMPLE III

Partial Bisphenol A Capping

A—Resin
Epon 829: 1596.7
Bisphenol A: 978.7
Monobutyl ether of ethylene glycol: 156.3

Heat to 130°–140° C. and allow to exotherm to about 200° C. Maintain temperature above 165° C. for two hours after peak exotherm. Theoretical equivalent weight based upon phenolic end group termination is 3000.

Monobutyl ether of ethylene glycol: 140.5
Normal butanol: 539.5
Add to dilute and cool to 100° C.
Acrylic resin "X": 2388.0

Deionized water: 457.0
Add rapidly in order. Heat to reflux and hold twenty-five minutes.
Deionized water: 5743.3
Preheat to 70°–80° C. and add evenly over 1 hour period.

B—Can Coating 1
Acrylic epoxy product from A: 2643.3
Deionized water: 1111.4
Normal butanol: 171.8
Cymel 373 (partially methylated) melamine formaldehyde resin: 70.5

This sample is ready to spray at 18.62% solids, pH of 7.35, and Zahn #1 viscosity of 82 seconds. The equivalent ratios are 4.6/3.0/1.0=carboxyl from acrylic polymer/dimethyl ethanol amine/bisphenol A polymer, phenolic hydroxyl terminated, of 3000 phenolic equivalent weight. The weight ratios are acrylic/epoxy=22.6/77.4. It has been modified with 7.5% melamine resin on solids. When applied to drawn and ironed cans and cured, the films show outstanding adhesion.

C—Can Coating 2
Acrylic epoxy product from A: 2643.3
Deionized water: 1121.4
Normal butanol: 171.8
(Resimene 980) Methylated urea formaldehyde resin: 60.5

This sample is ready to spray at 18.1% solids, pH of 7.45, and Zahn #1 viscosity of 66 seconds. The equivalent ratios are as in "B", except that this sample contains 7.5% urea resin on solids. When applied to drawn and ironed cans, and cured, the films show outstanding adhesion.

EXAMPLE IV

Partial Nonylphenol Capping

A—Resin
Epon 829: 574.2
Bisphenol A: 305.1
Monobutyl ether of ethylene glycol: 52.1
Nonylphenol: 31.3

Heat to 130°–140° C. and allow to exotherm to about 200° C. Maintain temperature above 165° C. for two hours after peak exotherm. Theoretical epoxy equivalent weight is 3000 before nonylphenol reaction.
Normal butanol: 166.7
Add to dilute and cool to 100° C.
Acrylic resin "X": 796.0
Add rapidly. Heat to reflux and hold 25 minutes.
Deionized water: 2105.9
Preheat to 70°–80° C. and add evenly over one hour period.

B—Can Coating
Acrylic epoxy product from A: 2497.6
Deionized water: 865.9
Normal butanol: 133.0
Dimethyl ethanol amine: 3.5

This sample is ready to spray at 20.24% solids, pH of 7.95, and Zahn #1 viscosity of 52 seconds. It has good application properties and good adhesion to drawn and ironed steel and aluminum cans. The equivalent ratios are 4.6/3.0/1.0/0.5=carboxyl from acrylic resin/dimethyl ethanol amine/epoxy resin of 3000 epoxy equivalent weight before reaction with nonylphenol/nonylphenol. The weight ratio of acrylic resin/epoxy resin=22.2/77.8.

EXAMPLE V

Complete Benzoate Capping

A—Resin
Epon 829: 1723.0
Bisphenol A: 915.0
Monobutyl ether of ethylene glycol: 156.3
Benzoic acid: 104.0

Heat to 130°–140° C. and allow to exotherm to 180°–200° C. Maintain temperature above 165° C. for two hours after peak exotherm. Theoretical epoxy equivalent weight is 3000 before benzoic acid reaction.
Normal butanol: 680.0
Add to dilute and cool to 100° C.
Acrylic resin "X": 2388.0
Deionized water: 457.0
Add rapidly in order. Heat to reflux and hold 25 minutes.
Deionized water: 5680.7
Preheat to 70°–80° C. and add evenly over one hour.

This product has equivalent ratios of 1.0/4.6/3.0/1.0=benzoic acid/carboxyl from acrylic polymer/dimethyl ethanol amine/epoxy resin of 3000 epoxy equivalent weight before reacting with benzoic acid. The weight ratio of acrylic resin/epoxy resin is 22.2/77.8. It can be reduced for application in 80/20 volume ratio of water/organic solvent as follows.

B—Can Coating 1
Acrylic epoxy product from A: 2852.9
Deionized water: 1014.0
Normal butanol: 129.6
Dimethyl ethanol amine: 8.0

This sample is ready to spray at 20.27% solids, pH of 7.9, and Zahn #1 viscosity of 37 seconds. It has good application properties and excellent adhesion to drawn and ironed cans.

C—Can Coating 2
Acrylic epoxy product from A: 2540.8
Deionized water: 1200.4
Normal butanol: 121.6
Monobutyl ether of ethylene glycol: 44.0
Dimethyl ethanol amine: 10.0
Butylated melamine formaldehyde resin (Cymel 1156): 83.2

This sample is ready to spray at 19.16% solids, pH of 7.95, and Zahn #1 viscosity of 36 seconds. The composition is as "B" with 10% of the solids replaced with a butylated melamine formaldehyde resin. It shows good application properties and good adhesion to drawn and ironed cans.

D—Can Coating 3
Acrylic epoxy product from A: 2540.8
Deionized water: 1200.4
Normal butanol: 121.6
Monobutyl ether of ethylene glycol: 44.0
Dimethyl ethanol amine: 10.0
Methylated urea formaldehyde resin (Beetle 65): 83.2

The sample is ready to spray at 18.64% solids, pH of 7.95, and Zahn #1 viscosity of 35 seconds. The modifying resin is 10% methylated urea formaldehyde resin. It shows good application properties and good adhesion to drawn and ironed cans.

What is claimed is:
1. A water-borne coating composition consisting essentially of liquid carrier and the product of the reaction in aqueous media of:

(A) not less than 50% by weight, based on the weight of (A) plus (B), of a modified polyepoxide in the form of an ester, an ether, or a phenolic hydroxyl which contained, prior to modification, on the average, two terminal 1,2-epoxy groups per molecule and had an epoxy equivalent weight of 750–5000, said modification being done by reacting at least about 25% of the epoxy groups with at least one of groups selected from monobasic acids to form esters, monohydric phenols to form ethers, or polyhydric phenols to form phenolic hydroxyl terminated polymers;

(B) a carboxyl-functional polymer in an amount sufficient to provide at least 1.25 equivalents of carboxyl groups, when the source of the carboxyl group is a monoprotic acid, and at least 2.0 equivalents of carboxyl groups, when the source of such groups is a diprotic acid, per equivalent of 1,2-epoxy groups in the epoxy resin, said polymer having a number average molecular weight (determined by gel permeation chromatography) of about 2,000–100,000 and an acid number of 100–500;

(C) at least 1.25 equivalents of a tertiary amine per equivalent of 1,2-epoxy groups in the epoxy resin, said tertiary amine being selected from the group consisting of $R_1R_2R_3N$, pyridine, N-methylpyrrole, N-methyl piperidine, N-methyl pyrrolidine, N-methyl morpholine, and mixtures thereof and wherein $R_1$ and $R_2$ are substituted or unsubstituted monovalent alkyl groups containing one or two carbon atoms in the alkyl portion and $R_3$ is a substituted or unsubstituted monovalent alkyl group containing 1–4 carbon atoms; and (D) optionally, 10–90% of the amount required for stoichiometric reaction with the carboxyl-functional polymer of (B) of at least one primary, secondary or tertiary amine or monofunctional quaternary ammonium hydroxide;

wherein for increasing ratios of carboxyl groups to 1,2-epoxy groups, the amount of amine is increased to keep the carboxyl-functional polymer water dispersible, in which reaction product at least about 50% of the epoxide groups on the modified polyepoxides are in the form of quaternary ammonium salts.

2. The composition of claim 1 wherein at least about 75% of the epoxide groups on the modified polyepoxides are in the form of quaternary ammonium salts.

3. The composition of claim 1 wherein components (A), (B) and (C) comprise about 0.1–50% by weight of the coating composition and the remainder is comprised of the liquid carrier which is water and, optionally, organic liquid in a volume ratio of from 70:30 to all water.

4. The composition of claim 2 wherein the liquid carrier is water and organic liquid in a volume ratio of about 80:20.

5. The composition of claim 1 wherein the group selected for the modification of the polyepoxide is at least one of pelargonic, stearic, para tertiary butyl benzoic, 2-ethyl hexoic, caprylic or benzoic acid.

6. The composition of claim 5 wherein the group selected for the modification of the polyepoxide is benzoic acid.

7. The composition of claim 1 wherein the group selected for the modification of the polyepoxide is at least one of monohydric phenols and hydrocarbon substituted monohydric phenols with 1–10 carbon atoms in the substituent.

8. The composition of claim 7 wherein the phenol selected is nonylphenol.

9. The composition of claim 1 wherein the group selected for the modification of the polyepoxide is at least one of polyhydric phenols.

10. The composition of claim 9 wherein the polyhydric phenol selected is bisphenol A.

11. The composition of claim 1 wherein the polyepoxide, before modification, has an epoxy equivalent weight of 1,500–4,000.

12. The composition of claim 1 wherein the carboxyl-functional polymer has an acid number of 150–350.

13. The composition of claim 1 wherein the carboxyl-functional polymer has a number average molecular weight of 3,000–40,000.

14. The composition of claim 1 wherein said carboxyl-functional polymer is present in an amount sufficient to provide at least 1.75 equivalents of carboxyl groups, when the source of the carboxyl group is a monoprotic acid, and at least 2.5 equivalents of carboxyl groups, when the source of such groups is a diprotic acid, per equivalent of 1,2-epoxy groups in the epoxy resin.

15. The composition of claim 14 wherein said carboxyl-functional polymer is present in an amount sufficient to provide 1.5–2.5 equivalents of carboxyl groups per equivalent of 1,2-epoxy groups and said tertiary amine of (C) is present in the amount of 2.0–2.5 equivalents per equivalent of 1,2-epoxy groups.

16. The composition of claim 1 wherein said carboxyl-functional polymer is present in an amount sufficient to provide no more than 6.0 equivalents of carboxyl groups per equivalent of 1,2-epoxy groups in the epoxy resin.

17. The composition of claim 1 wherein said carboxyl-functional polymer is a polymer of at least one $\alpha,\beta$-ethylenically unsaturated monomer and at least one $\alpha,\beta$-ethylenically unsaturated acid.

18. The composition of claim 17 wherein said $\alpha,\beta$-ethylenically unsaturated acid is represented by the structures:

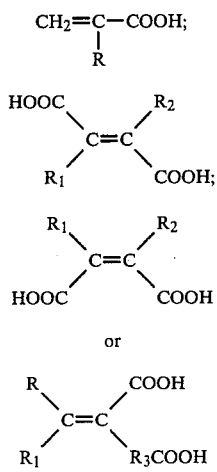

wherein R is hydrogen or an alkyl radical of 1–6 carbon atoms, $R_1$ and $R_2$ are hydrogen, an alkyl radical of 1–8 carbon atoms, halogen, cycloalkyl of 3–7 carbon atoms or phenyl, and $R_3$ is an alkylene radical of 1–6 carbon atoms; or half-esters thereof with alkanols of 1-8 carbon atoms.

19. The composition of claim 18 wherein said α,β-ethylenically unsaturated acid is selected from the group consisting of acrylic acid, methacrylic acid, and itaconic acid.

20. The composition of claim 17 wherein said α,β-ethylenically unsaturated monomer is selected from the group consisting of

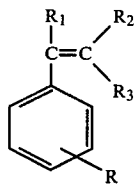 (a)

where R, $R_1$, $R_2$ and $R_3$ are hydrogen or an alkyl radical of 1-5 carbon atoms;

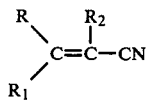 (b)

where R and $R_1$ are hydrogen, an alkyl radical of 1-18 carbon atoms, tolyl, benzyl or phenyl, and $R_2$ is hydrogen or methyl;

(c) esters of acrylic acid, methacrylic acid or mixtures thereof with alkanols of 1-16 carbon atoms;

(d) a mixture of up to 20% of said polymer, of hydroxyalkyl (meth)acrylate with at least one of (a), (b) and (c); and (e) a mixture of up to 20% of said polymer of (meth)acrylamide or N-alkoxymethyl (meth)acrylamide with at least one of (a), (b) and (c).

21. The composition of claim 20 wherein the α,β-ethylenically unsaturated acid is selected from the group consisting of acrylic acid, methacrylic acid, and itaconic acid.

22. The composition of claim 1 wherein said epoxy resin is 50-90% by weight of (A) plus (B).

23. The composition of claim 1 wherein the tertiary amine of (C) $R_1R_2R_3N$ is selected from the group consisting of trimethyl amine, dimethyl ethanol amine, methyl diethanol amine, diethyl methyl amine, ethyl methyl ethanol amine, dimethyl benzyl amine, dimethyl propyl amine, dimethyl ethyl amine, dimethyl 3-hydroxy-1-propyl amine, dimethyl 2-hydroxy-1-propyl amine, dimethyl 1-hydroxy-2-propyl amine, and mixtures thereof.

24. The composition of claim 23 wherein the tertiary amine of (C) is dimethyl ethanol amine.

25. The composition of claim 1 additionally containing a crosslinking agent which is at least one of phenol formaldehyde and a nitrogen resin.

26. An article coated with a cured coating based on the composition of claim 1.

27. An article coated with a cured coating based on the composition of claim 1 additionally containing a crosslinking agent which is at least one of phenol formaldehyde and a nitrogen resin.

28. A coating composition of claim 1 wherein components (A), (B) and (C) are capable of forming a hydrogel structure.

* * * * *